US012116097B1

(12) United States Patent
Amerling et al.

(10) Patent No.: US 12,116,097 B1
(45) Date of Patent: Oct. 15, 2024

(54) COWLINGS AND HINGE ASSEMBLIES FOR COWLINGS ON MARINE DRIVES

(71) Applicant: Brunswick Corporation, Mettawa, IL (US)

(72) Inventors: Steven J. Amerling, Fond du Lac, WI (US); Brad J. VanRuiswyk, Waupun, WI (US); Devan R. Faust, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/204,638

(22) Filed: Jun. 1, 2023

Related U.S. Application Data

(63) Continuation of application No. 17/068,536, filed on Oct. 12, 2020, now Pat. No. 11,708,142.

(51) Int. Cl.

*B63H 20/32* (2006.01)
*E05B 73/00* (2006.01)
*E05C 19/12* (2006.01)

(52) U.S. Cl.

CPC ......... *B63H 20/32* (2013.01); *E05B 73/0076* (2013.01); *E05C 19/12* (2013.01)

(58) Field of Classification Search

CPC ...... B63H 20/32; E05B 73/0076; E05C 19/12
See application file for complete search history.

(56) References Cited

U.S. PATENT DOCUMENTS

| | | | | |
|---|---|---|---|---|
| 3,358,668 | A | 12/1967 | Post et al. | |
| 3,598,273 | A | 8/1971 | Rau et al. | |
| 3,955,526 | A | 5/1976 | Kusche | |
| 4,600,396 | A | 7/1986 | Crane et al. | |
| 6,669,517 | B1 | 12/2003 | Alby et al. | |
| 6,682,379 | B1 * | 1/2004 | Walczak | B63H 20/32 123/195 P |
| 7,267,592 | B1 | 9/2007 | Ingebritson et al. | |
| 9,341,008 | B1 | 5/2016 | Amerling et al. | |
| 9,580,947 | B1 | 2/2017 | Amerling et al. | |
| 9,926,064 | B1 | 3/2018 | Tuchscherer | |
| 10,005,534 | B1 | 6/2018 | Amerling et al. | |
| 10,161,168 | B1 | 12/2018 | VanRuiswyk et al. | |
| 10,800,502 | B1 | 10/2020 | Alby et al. | |
| 11,312,462 | B1 | 4/2022 | Faust et al. | |
| 11,577,809 | B1 | 2/2023 | Faust et al. | |

OTHER PUBLICATIONS

Inventor's Declaration of Prior Art.

* cited by examiner

*Primary Examiner* — Stephen P Avila

(74) *Attorney, Agent, or Firm* — Andrus Intellectual Property Law, LLP

(57) ABSTRACT

A hinge assembly is for a cowling on a marine drive. The cowling has a first cowl portion and a second cowl portion which together enclose a cowl interior. The hinge assembly has a first base frame configured for fixed attachment to an interior surface of the first cowl portion and a second base frame configured for fixed attachment to an interior surface of the second cowl portion. The second base frame is pivotally coupled to the first base frame by a connection device that enables manual removal of the second base frame from the intermediate frame without use of a tool, thus facilitating manual removal of the second cowl portion from the first cowl portion without the use of the tool.

20 Claims, 16 Drawing Sheets

COWLINGS AND HINGE ASSEMBLIES FOR COWLINGS ON MARINE DRIVES

CROSS-REFERENCE TO RELATED APPLICATION

The present application is a continuation of U.S. application Ser. No. 17/068,536, filed Oct. 12, 2020, which application is hereby incorporated by reference in their entirety.

FIELD

The present disclosure relates to cowlings for marine drives and to hinge assemblies for cowlings for marine drives.

BACKGROUND

The following U.S. Patents are incorporated herein by reference:

U.S. Pat. No. 10,161,168 discloses a latching assembly for a cowl on a marine drive, the cowl having a first cowl portion and a second cowl portion that mates with the first cowl portion. A latching device is configured to latch and unlatch the first cowl portion to the second cowl portion. An actuator actuates the latching device. A flexible connector has a first end coupled to the latching device and a second end coupled to the actuator. Actuation of the actuator pulls the flexible connector to rotate a pulley and actuate the latching device. One of the first and second ends has a spherical bearing that is nested in a cylindrical bearing and seated in a cavity in the pulley. Pulling on the flexible connector pulls the spherical bearing against the cylindrical bearing such that the cylindrical bearing is pulled against the cavity in the pulley, thereby causing the pulley to rotate.

U.S. Pat. No. 10,005,534 discloses an assembly for aligning and stabilizing first and second cowl portions on a marine engine. The assembly comprises an engagement member configured to be fixed to the first cowl portion and a retainer portion apparatus configured to be fixed to the second cowl portion. The retainer apparatus is configured to receive the engagement member when one of the first cowl portion and second cowl portion is moved towards the other of the first cowl portion and the second cowl portion. The retainer apparatus comprises a retainer body and opposing guide members that are pivotable with respect to the retainer body. As the retainer apparatus receives the engagement member, the engagement member engages and causes the guide members to pivot with respect to the retainer body such that the engagement member becomes sandwiched between the guide members, thus aligning and stabilizing the first and second cowl portions.

U.S. Pat. No. 9,926,064 discloses a latching apparatus for a cowl on an outboard marine engine. The cowl has a first cowl portion and a second cowl portion, which are latched together by the latching apparatus in a closed cowl position and unlatched from each other in an open cowl position. The latching apparatus comprises a retainer on the first cowl portion; an actuator device on the second cowl portion, and a wire coupled to the actuator device. The wire is coupled to the retainer in the closed cowl position and the wire is uncoupled from the retainer in the open cowl position. Actuation of the actuator device in a first direction rotates the wire so as to couple the wire to the retainer and actuation of the actuator device in a second direction rotates the wire so as to uncouple the wire from the retainer.

U.S. Pat. No. 9,580,947 discloses a cowl for an outboard marine propulsion device having an internal combustion engine. The cowl comprises a first cowl portion; a second cowl portion that mates with the first cowl portion to enclose the internal combustion engine; a service door on the second cowl portion, wherein the service door is positionable in an open position and in a closed position; and a carrying handle on the second cowl portion, wherein the carrying handle is accessible when the service door is in the open position and inaccessible when the service door is in the closed position. A plurality of latches are spaced apart around the perimeter. The latches latch the second cowl portion to the first cowl portion. An actuator assembly actuates each of the plurality of latches. The actuator assembly can be actuated by movement of the carrying handle.

U.S. Pat. No. 9,341,008 discloses a hinge assembly for a cowl of an outboard motor. The hinge assembly is configured to connect a first portion of the cowl to a second portion of the cowl. The hinge assembly comprises an arm that is connected to one of the first and second cowl portions and a retainer that is connected to the other of the first and second cowl portions. The arm is movable with respect to the retainer between a registered position wherein the arm is retained by and pivotable with respect to the retainer to thereby pivotably connect the first portion of the cowl to the second portion of the cowl and an unregistered position wherein the arm is separated from the retainer so that the first portion of the cowl is separated from the second portion of the cowl.

U.S. Pat. No. 7,267,592 discloses a latch mechanism for a cowl of an outboard motor provides a handle and retaining mechanism for the handle which define a detent position when the handle is in a latching or closed position. A protrusion of the handle rotates in a plane which places it between a roller and a metallic ball when the handle is in a latching position. The metallic ball is shaped to be received in a groove formed in the protrusion in order to define the detent position when the handle is in its latched position.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

A hinge assembly is for a cowling on a marine drive. The cowling has a first cowl portion and a second cowl portion which together enclose a cowl interior. The hinge assembly has a first base frame configured for fixed attachment to an interior surface of the first cowl portion and a second base frame configured for fixed attachment to an interior surface of the second cowl portion. The second base frame is pivotally coupled to the first base frame by a connection device that enables manual removal of the second base frame from the intermediate frame without use of a tool, thus facilitating manual removal of the second cowl portion from the first cowl portion without the use of the tool.

An intermediate frame is pivotally coupled to the first base frame along a first pivot axis and pivotally coupled to the second base frame along a second pivot axis. The intermediate frame and the second base frame are pivotable together about the first pivot axis, so as to pivot the second cowl portion relative to the first cowl portion, thereby facilitating opening of the cowl interior and alternately closing of the cowl interior. In some examples, a gas spring assists pivoting of the second cowl portion during opening of the cowl interior and dampens movement of the second cowl portion during closing of the cowl interior.

BRIEF DESCRIPTION OF THE DRAWINGS

The present disclosure is described with reference to the following Figures.

DETAILED DESCRIPTION OF THE DRAWINGS

Figure 1:
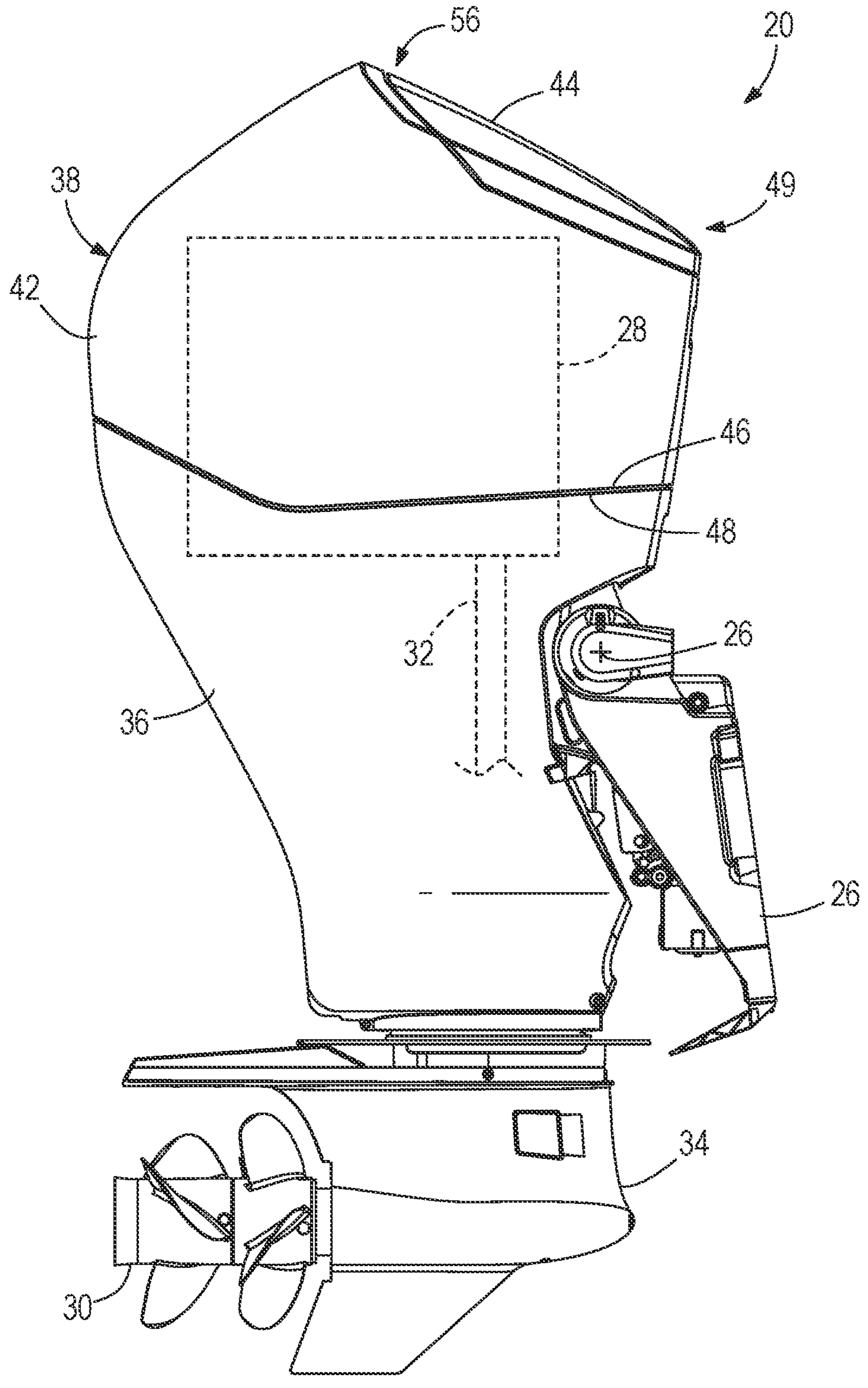
FIG. 1 is a starboard side view of an outboard motor coupled to the transom of a marine vessel.

FIG. 1 depicts a marine drive, which in the illustrated example is an outboard motor 20 for propelling a marine vessel in water. The outboard motor 20 is coupled to the transom of the marine vessel via a transom bracket 26, which facilitates trimming of the outboard motor 20 up and down relative to the marine vessel about a trim axis 26. The outboard motor 20 has a powerhead 28, which can include an internal combustion engine and/or any other conventional means for operating one or more propellers 30 supported on a lower gearcase 34. The powerhead 28 is operably connected to the propellers 30 by a driveshaft 32, such that operation of the powerhead 28 causes rotation of the propellers 30, which thereby propels the marine vessel in the water. In the illustrated example, the lower gearcase 34 is steerable relative to the rest of the outboard motor 20 so as to steer the direction in which the marine vessel is propelled. The configuration of the lower gearcase is more fully described in U.S. patent application Ser. No. 16/171,490, which is herein cited and incorporated by reference. For the purposes of the present invention, the configuration of the marine drive can vary from what is shown.

Figure 2:
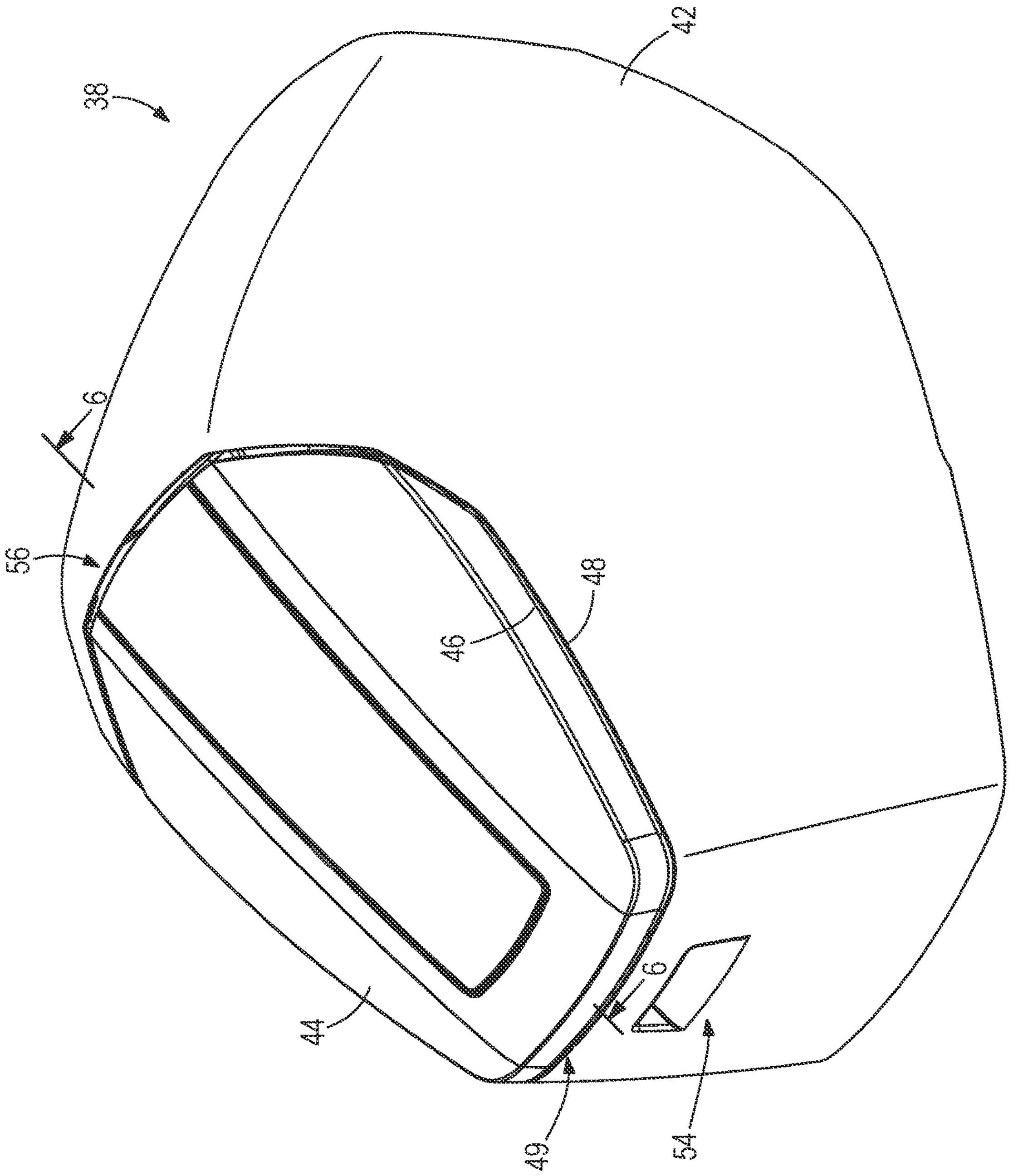
FIG. 2 is a port perspective side view looking down at a top cowl for the outboard motor, the top cowl having a top cowl body and a service door that permits manual access to the cowl interior.
Figure 5:
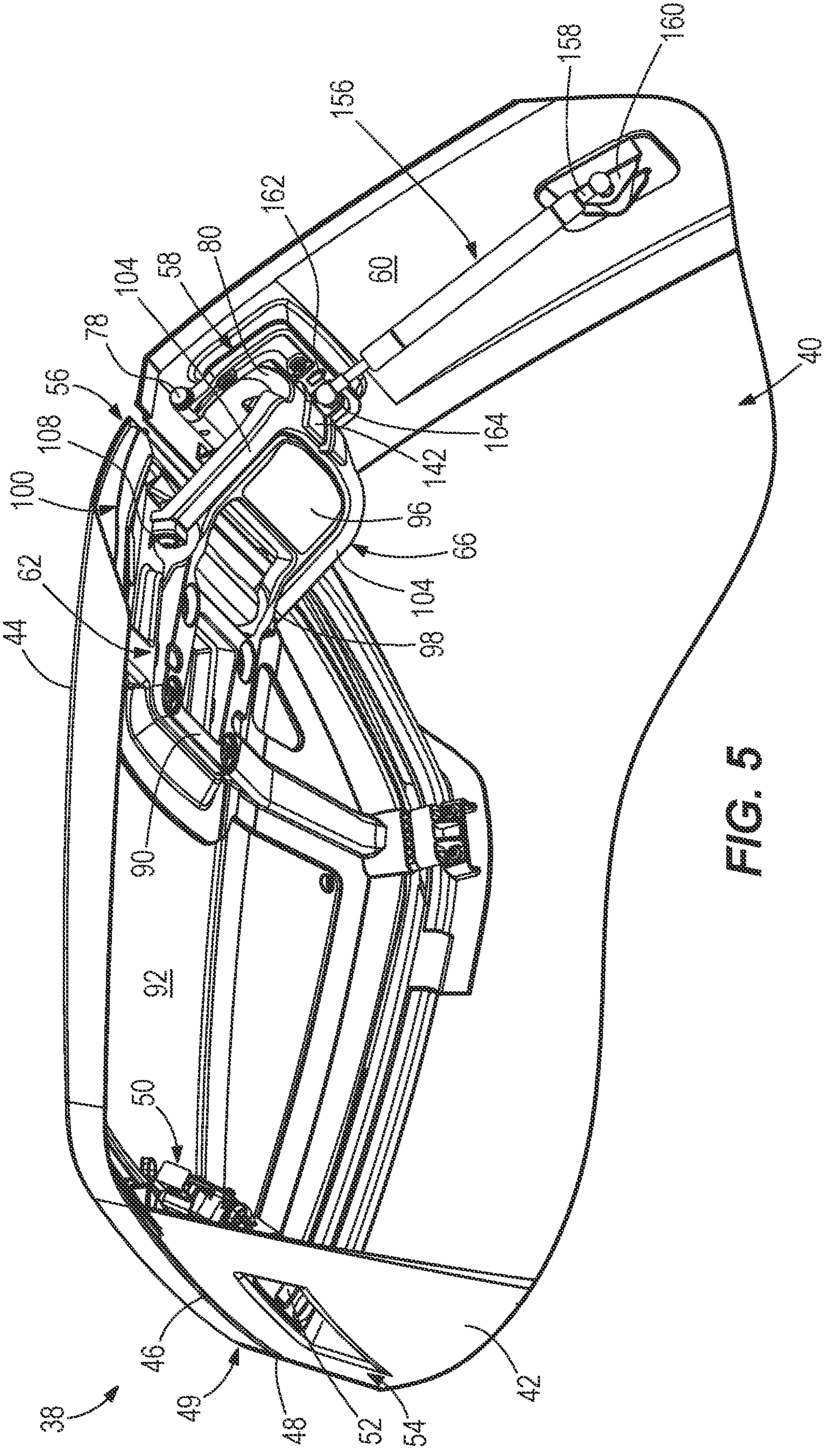
FIG. 5 is an interior perspective view, showing the hinge assembly and the service door in a closed position.

Referring to FIGS. 1 and 2, the outboard motor 20 has a lower cowling 36 that extends below the powerhead 28 and generally encloses the driveshaft 32 and various other components of the outboard motor 20. The outboard motor 20 also has a top cowling 38 extending over the powerhead 28 and generally enclosing a cowling interior or powerhead compartment 40. The top cowling 38 has a first cowl portion or top cowl body 42 which generally surrounds the powerhead 28 and is fixed in place relative to the lower cowling 36. The means for fixing the top cowling 38 relative to the lower cowling 36 can vary, and examples are disclosed in the applicant's co-pending U.S. patent application Ser. No. 16/986,669, which is herein cited and incorporated by reference. In other examples, the means for fixing the top cowl body 42 to the lower cowling 36 can include bolts or any other fasteners. In still other examples, the top cowl body 42 and lower cowling 36 can be formed as a single component. The top cowling 38 also has a second cowl portion or service door 44 that together with the top cowl body 42 encloses the powerhead compartment 40. The service door 44 is pivotable relative to the top cowl body 42 so as to provide manual access to the powerhead compartment 40, for example during servicing of the powerhead 28. In particular, the service door 44 has a generally rectangular shape and includes an outer perimeter 46 that faces an outer perimeter 48 on an upper forward side of the top cowl body 42. FIG. 2 shows the service door 44 in a closed position, wherein the service door 44 and top cowl body 42 enclose the powerhead compartment 40 relative to the lower cowling 36. The service door 44 has a forward side 49 that is latched to the lower cowling 36 by a latching device 50 (see FIG. 5). The type and configuration of the latching device 50 can vary from what is shown, and in some examples comprises a simple hook mechanism, such as is described in the presently incorporated patents that are summarized herein above. In the illustrated example the latching device 50 is an electrically actuated latch and pawl mechanism, which is more fully described in the applicant's co-pending U.S. patent application Ser. No. 16/986,938, which is herein cited and incorporated by reference. As shown, the latching device 50 is manually actuated by a pushbutton 52 located in a handle recess 54 at the forward side of the top cowl body 42. In a latched position, the forward side 49 of the service door 44 is latched to the top cowl body 42 in the position shown in FIG. 2. In an unlatched position, the forward side 49 of the service door 44 is movable into the open cowl position, as shown in FIG. 7, and as will be further described herein below.

Figure 3:
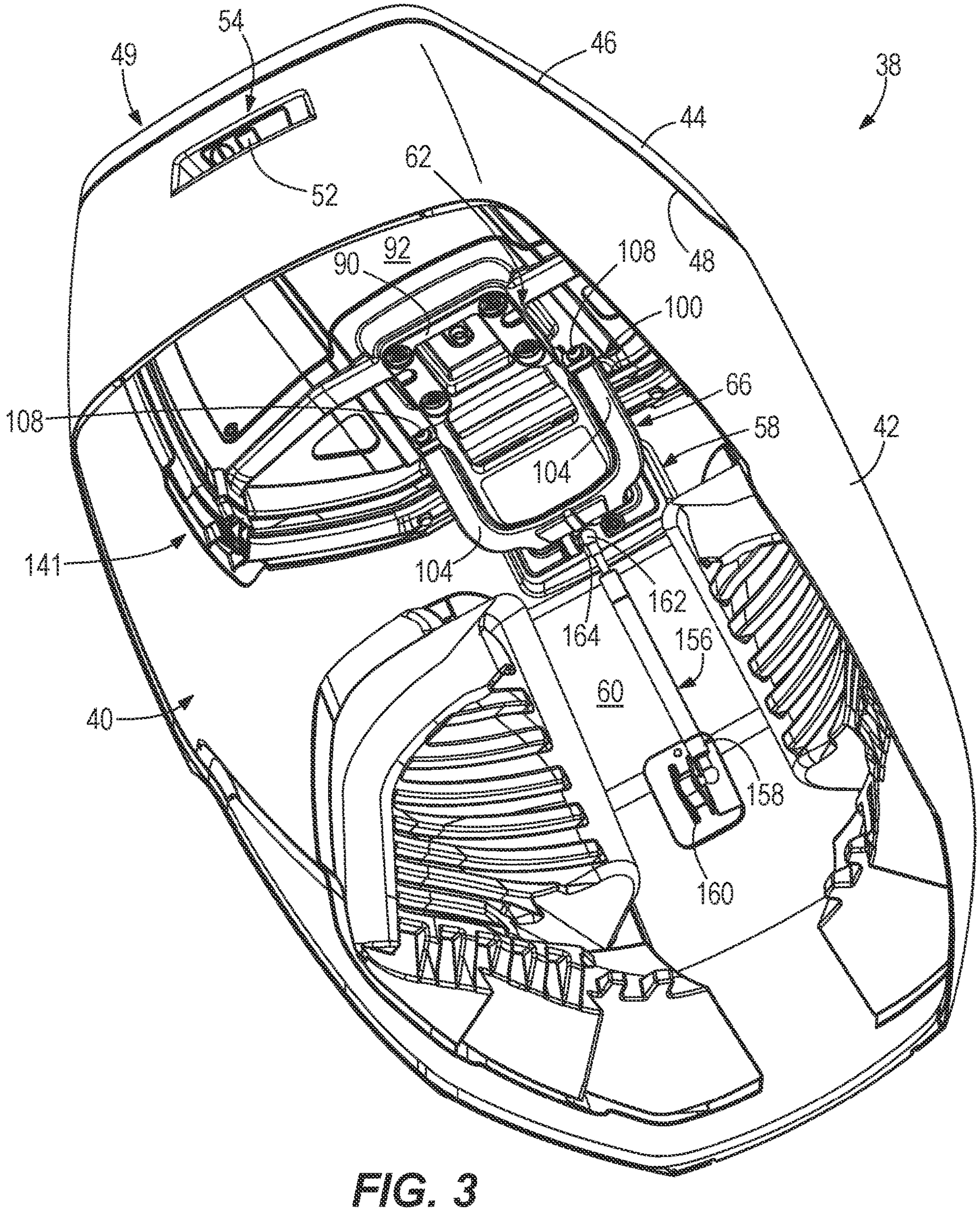
FIG. 3 is a perspective view looking up at the cowl interior, showing a hinge assembly facilitating opening of the cowl interior and alternately closing of the cowl interior.
Figure 4:
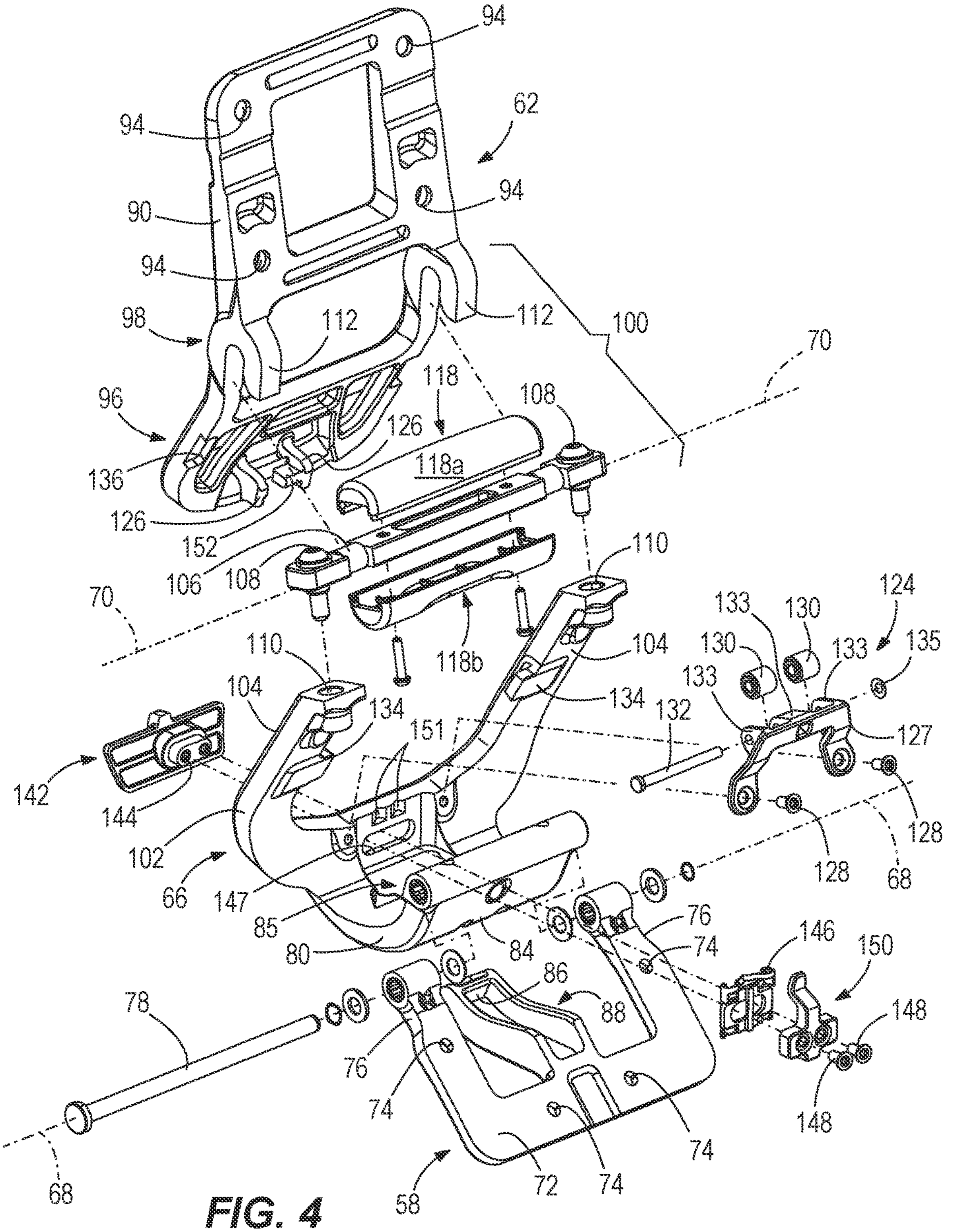
FIG. 4 is an exploded view of the hinge assembly, having first and second base frames and an intermediate frame.
Figure 7:
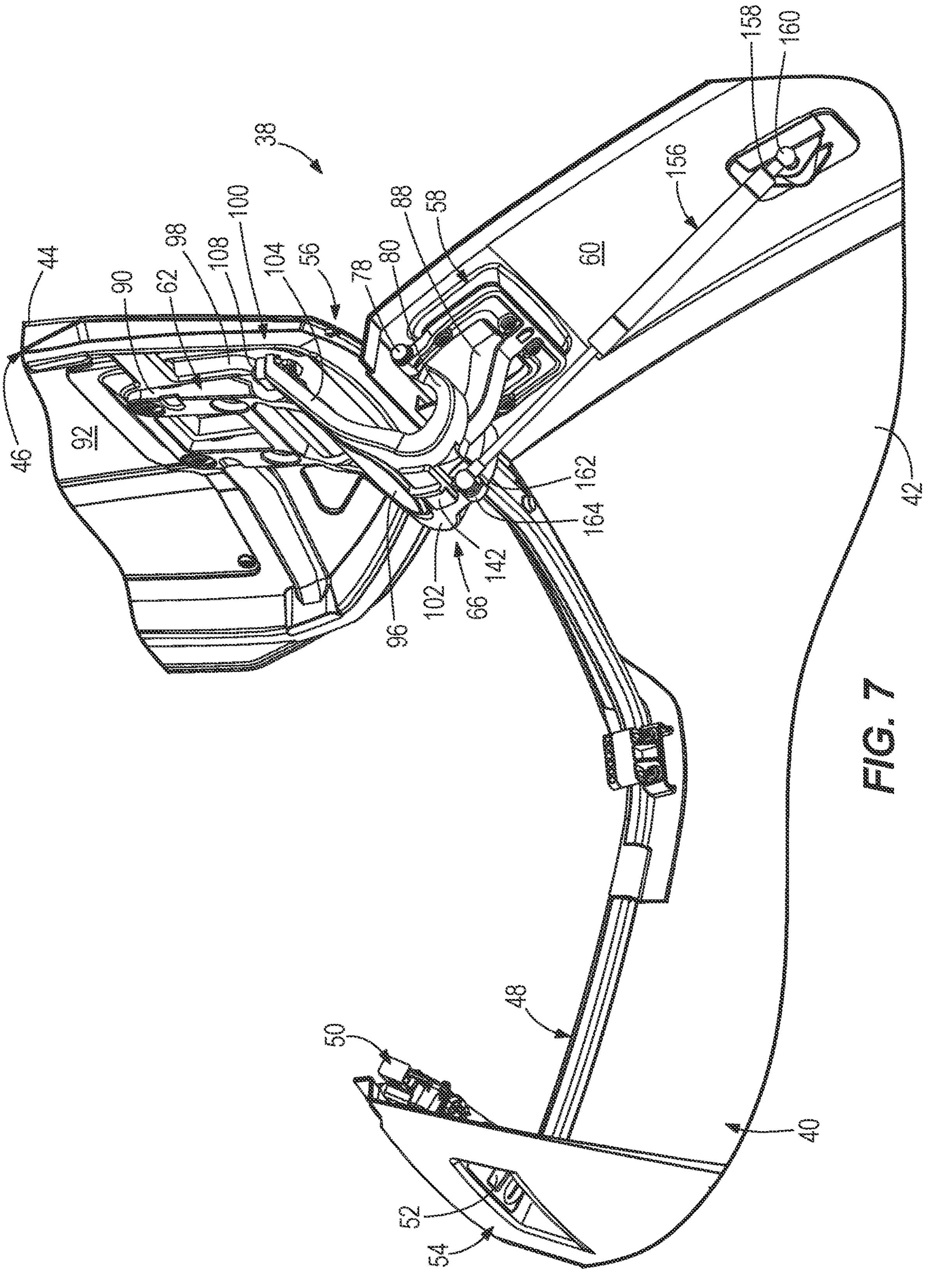
FIG. 7 is a view like FIG. 5, showing the hinge assembly in a raised position and the service door in an open cowl position.
Figure 12:
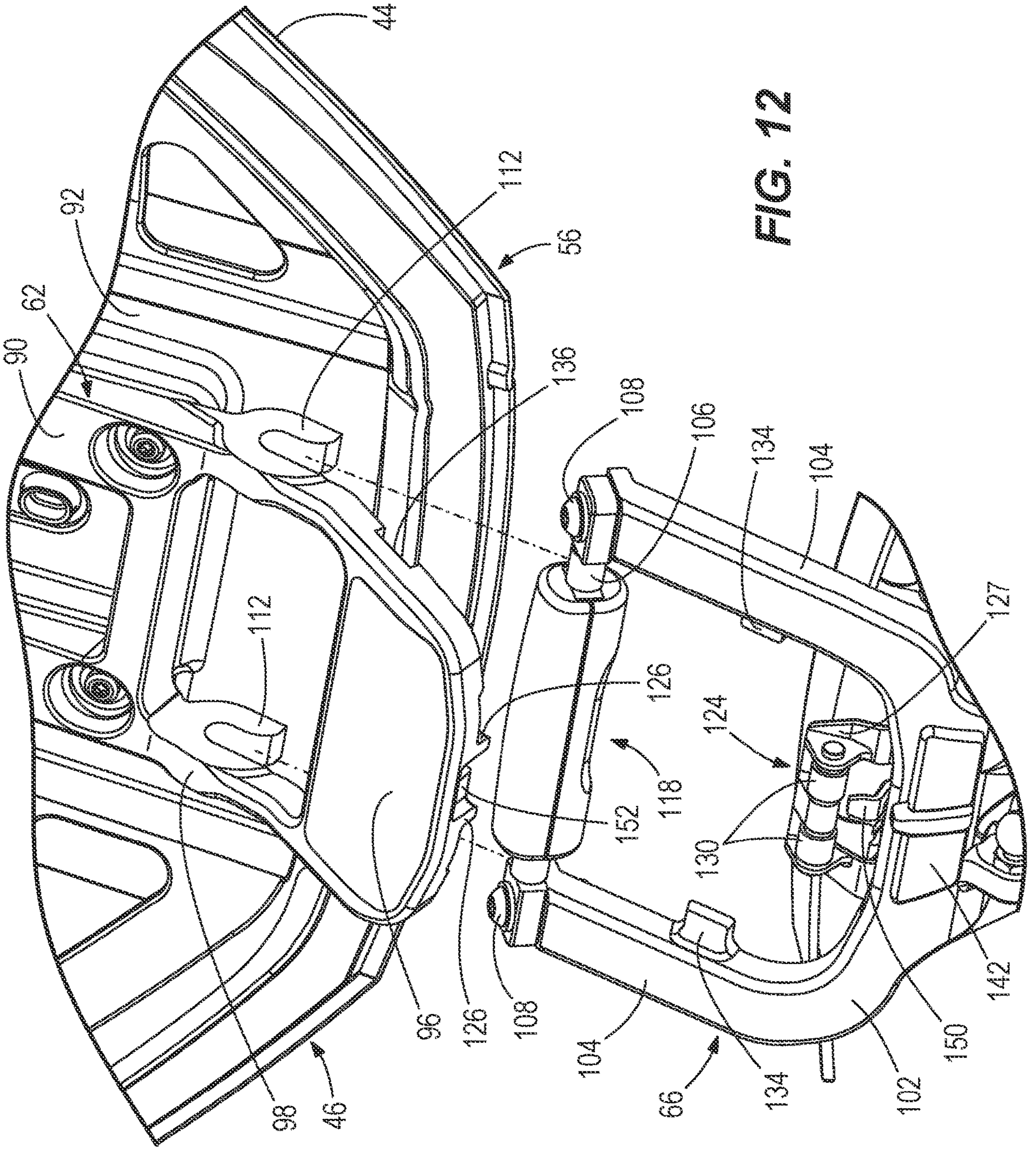
FIG. 12 shows the second base frame and service door being manually removed from the intermediate frame and top cowl body.

A novel hinge assembly, which is a subject of the present disclosure, advantageously pivotably and removably couples the rearward side 56 of the service door 44 to the top cowl body 42, so that the service door 44 is pivotable into and between the closed cowl position shown in FIG. 2 and open cowl position shown in FIG. 7, and so that the service door 44 advantageously can be removed from the top cowl body 42, as shown in FIG. 12, providing enhanced access to the powerhead compartment 40 as will be further described herein below. Referring to FIGS. 3 and 4, the hinge assembly has a first base frame 58 that is configured for fixed attachment to the interior surface 60 of the top cowl body 42, a second base frame 62 that is configured for attachment to the interior surface of the service door 44, and an intermediate frame 66 that is pivotably coupled to the first base frame 58 along a first pivot axis 68 and pivotally coupled to the second base frame 62 along a second pivot axis 70. As will be described further herein below, the intermediate frame 66 and the second base frame 62 are pivotable together about the first pivot axis 68 into and between a lowered position, see FIG. 2, in which the service door 44 is closed and a raised position, see FIG. 7, in which the powerhead compartment 40 is manually accessible.

Figure 8:
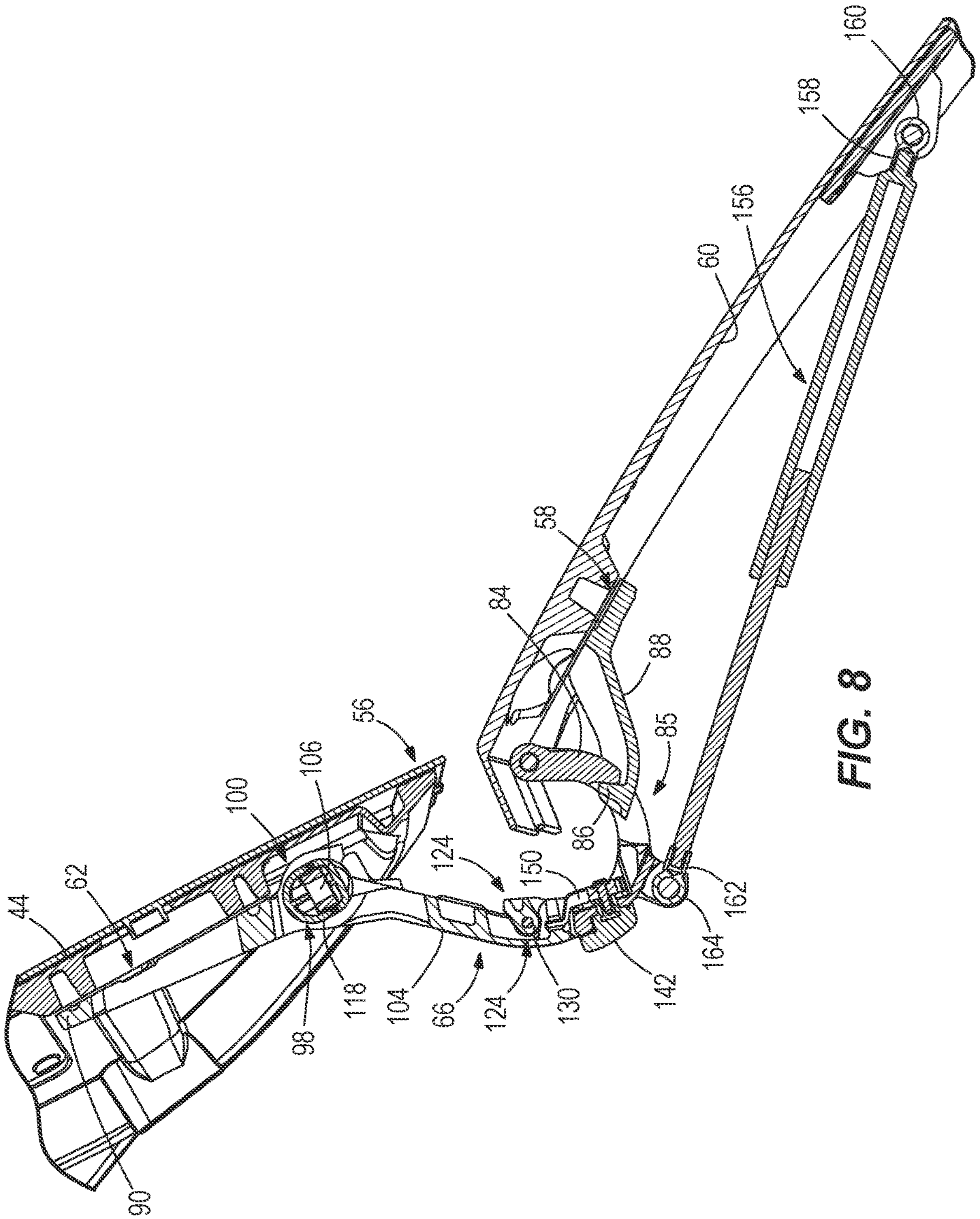
FIG. 8 is a sectional view of what is illustrated in FIG. 7.

Referring to FIG. 4, the first base frame 58 has a generally U-shaped base portion 72 that is configured for fixed attachment to the interior surface 60 of the top cowl body 42, for example via fasteners which extend through fastener holes 74 and into connection with the top cowl body 42. The first base frame 58 has engagement arms 76 that extend from the base portion 72. Each engagement arm 76 has a bearing for supporting a pivot axle 78, which extends between the engagement arms 76 along the first pivot axis 68. The intermediate frame 66 includes a curved pivot arm 80 having a bearing that is coupled to the pivot axle 78 between the engagement arms 76. The intermediate frame 66 is thus pivotable about the first pivot axis 68 and relative to the first base frame 58. Referring to FIGS. 4 and 8, an aperture 85 is formed through the pivot arm 80. An engagement finger 84 extends from the pivot arm 80, into the aperture 85, and provides a stop member for preventing the intermediate frame 66 and second base frame 62 from pivoting past the raised position shown in FIG. 8. A corresponding stop member is provided by an end surface 86 of a curved track member 88 that extends from the first base frame 58, between the engagement arms 76. The track member 88 extends into the aperture 85 in the pivot arm 80 and the engagement finger 84 is disposed in the track member 88, such that pivoting the intermediate frame 66 and second base frame 62 into the raised position brings the engagement finger 84 into contact with the end surface 86, which prevents further rotation past the raised position shown in FIG. 8.

Referring to FIG. 4, the second base frame 62 has a base portion 90 that is configured for fixed attachment to the interior surface 92 of the service door 44, for example via fasteners which extend through fastener holes 94 and into connection with the service door 44. The second base frame 62 also has a front portion 96 and a generally curved middle portion 98 located between the base portion 90 and the front portion 96. The second base frame 62 is pivotally coupled to the intermediate frame 66 by a novel connection device that enables manual removal of the second base frame 62 from the intermediate frame 66, and manual reattachment of the second base frame 62 to the intermediate frame 66. As further described herein below, this novel device advantageously permits manual removal of the service door 44 from the top cowl body 42 without the use of a tool and efficiently facilitating servicing of the powerhead 28 and associated components in the powerhead compartment 40.

Referring to FIG. 4, the novel connection device includes a clevis device 100 that connects the middle portion 98 of the second base frame 62 to the intermediate frame 66. The intermediate frame 66 has a generally U-shaped base portion 102 and a pair of clevis arms 104 that support a clevis axle 106 extending along the second pivot axis 70. The means for connecting the clevis axle 106 to the clevis arms 104 can vary, and in the illustrated example includes threaded fasteners 108 engaged in threaded bores 110 in the clevis arms 104. Two clevis hooks 112 extend from the outer surface of the middle portion 98 of the second base frame 62 and are configured to engage with the clevis axle 106, as shown by dash-and-dot lines in FIG. 4, such that the second base frame 62 is pivotable about the second pivot axis 70 and relative to the intermediate frame 66.

Referring to FIGS. 4 and 12, a handle 118 is located on the clevis axle 106 and advantageously is configured for manual grasping and lifting of the top cowl body 42 via the intermediate frame 66 and first base frame 58 when these components are in the raised position shown in FIGS. 7 and 12 and when the second base frame 62 and service door 44 have been removed. In the illustrated example, the handle 118 includes top and bottom clamshell handle halves 118*a*, 118*b* that are fastened to the clevis axle 106 between the clevis arms 104. The clevis hooks 112 engage with the clevis axle 106 on opposite sides of the handle 118.

Figure 9:
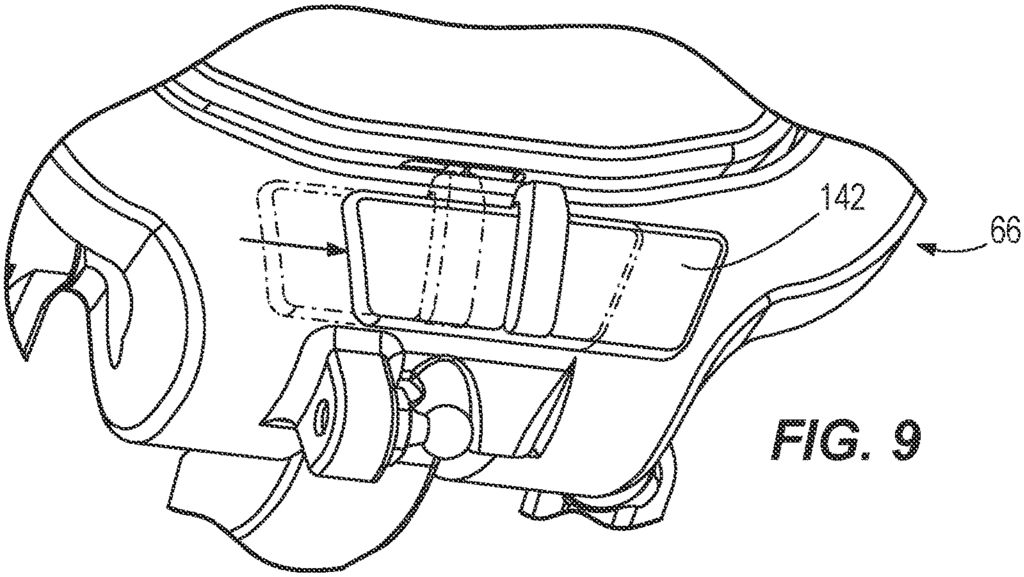
FIG. 9 is a view of a locking device for locking a detent mechanism on the latching assembly.
Figure 10:
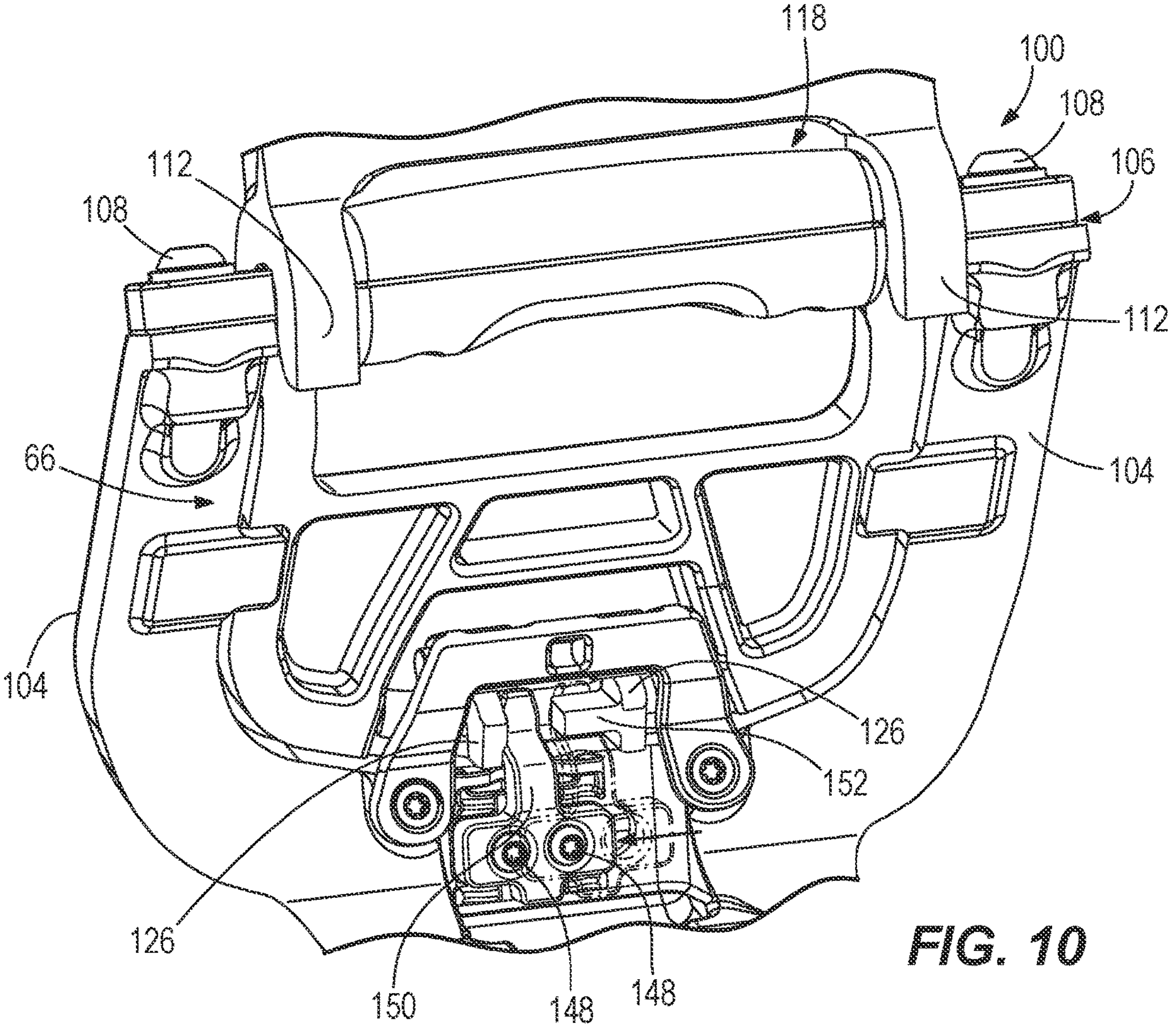
FIG. 10 is an interior view of the latching assembly, showing a clevis device, the locking device, and the detent mechanism.
Figure 11:
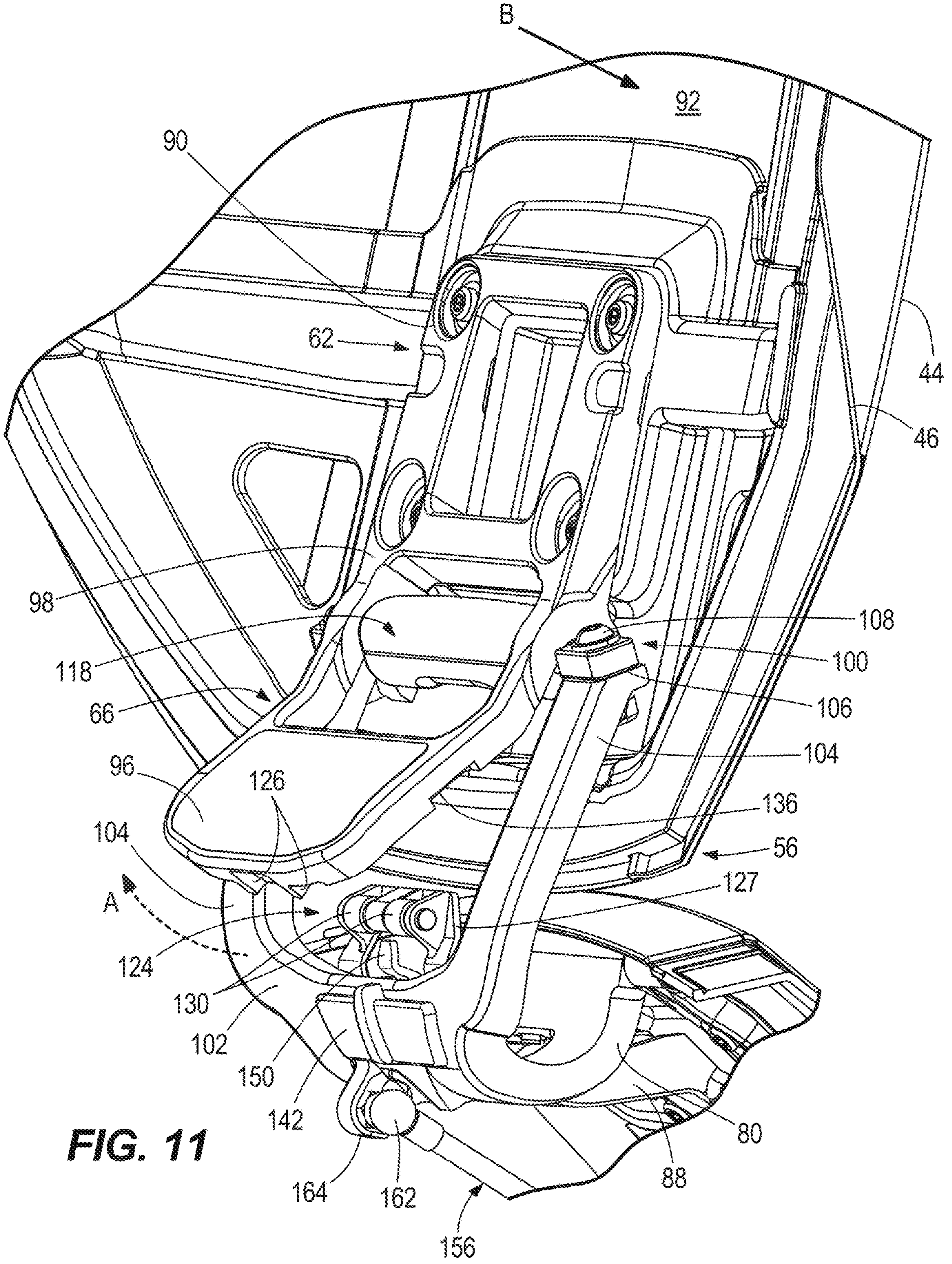
FIG. 11 shows the second base frame released from the intermediate frame via the detent mechanism.
Figure 15:
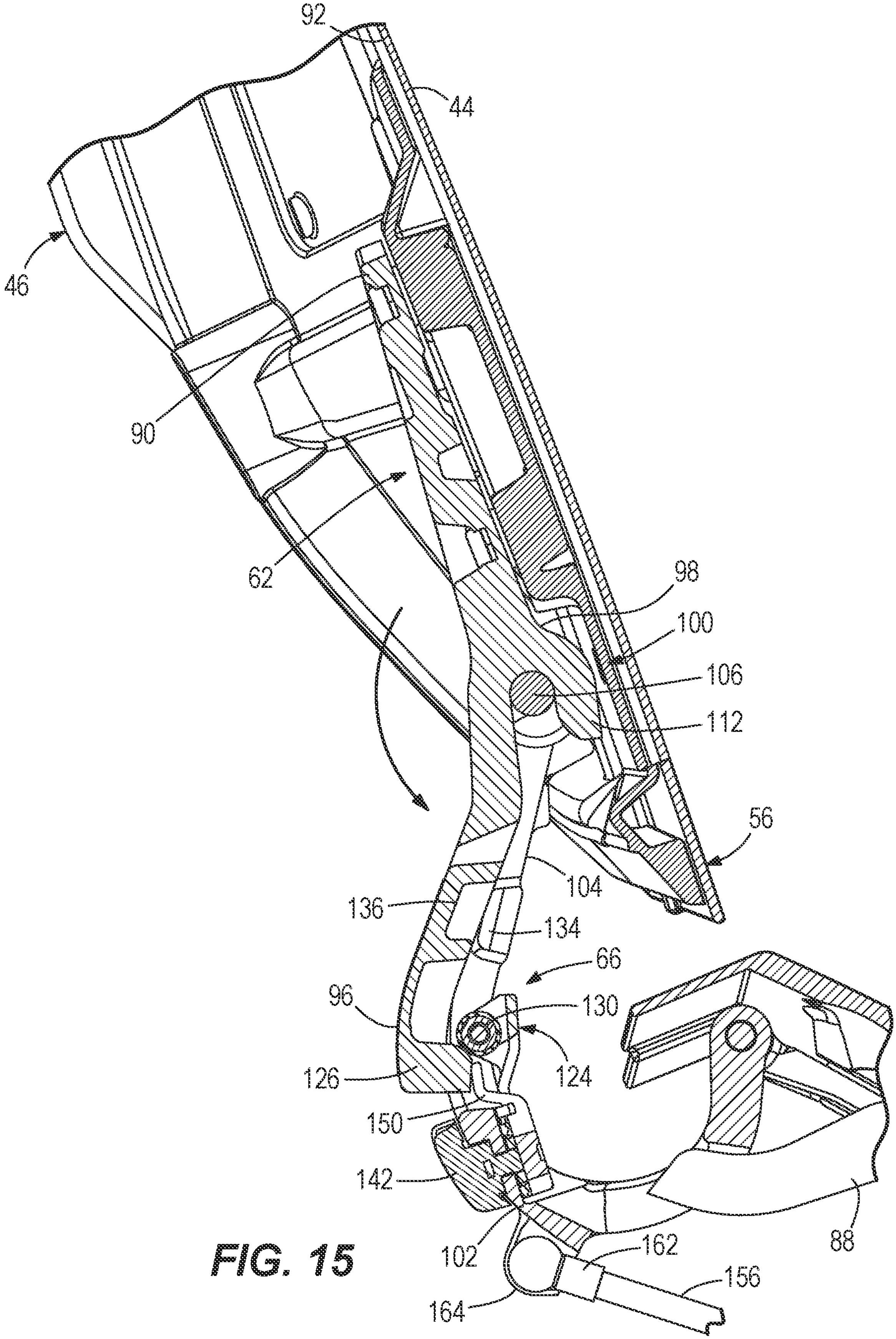
Figure 17:
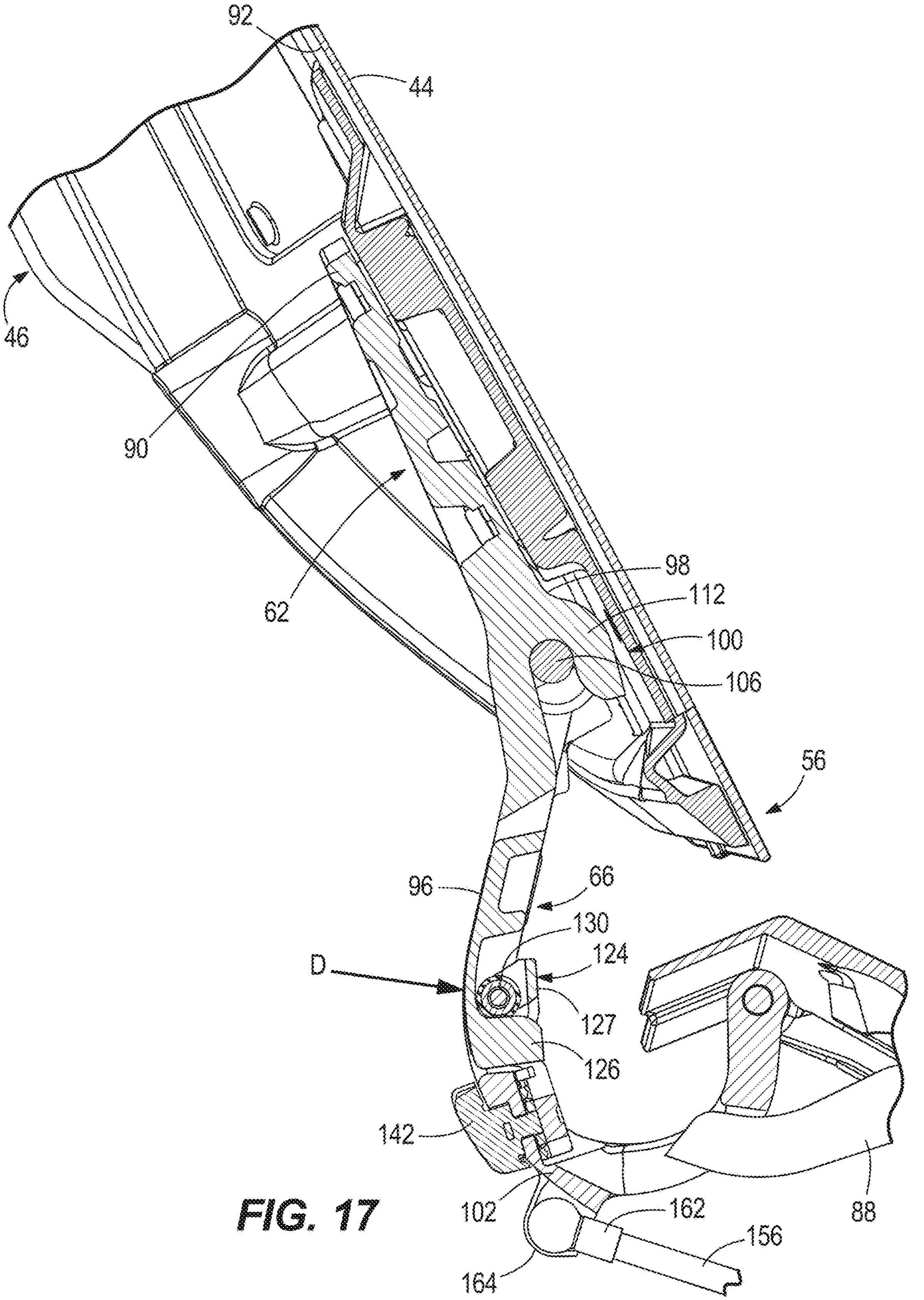

Referring to FIGS. 4 and 9-11, the novel connection device further includes a detent mechanism that retains the second base frame 62 in position with respect to the intermediate frame 66. More specifically, the detent mechanism removably couples the front portion 96 of the second base frame 62 to the base portion 102 of the intermediate frame 66. The detent mechanism includes a roller assembly 124 on the intermediate frame 66 between the clevis arms 104 at the base of the U-shape of the base portion 102. The roller assembly 124 includes a supporting bracket 127 that is fixed to the base portion 102 by fasteners 128. A pair of rollers 130 are supported by a roller axle 132 extending through bearings 133 on the supporting bracket 127. The roller axle 132 is secured with respect to the bearings 133 by an end fixture 135. The rollers 130 include metal inner and outer cylinders with an elastomeric core which allows eccentric movement of the cylinders as a radial load is applied to the component. Referring to FIGS. 4 and 10, the detent mechanism further includes an engagement structure on the front portion 96 of the second base frame 62, which pops into engagement with the roller assembly 124 when the second base frame 62 is manually pivoted about the second pivot axis 70 in FIG. 15 and into the position shown in FIG. 17. Referring to FIG. 4, the engagement structure includes a pair of flanges 126 that extend from the front portion 96 and are configured to engage with the rollers 130, as shown in FIG. 15. Manually rotating the second base frame 62 causes convexly contoured surfaces of the pair of flanges 126 to roll over the rollers 130 as the rollers are eccentrically compressed until the engagement structure pops into place via the convex contours and resilient rollers 130, as shown in FIG. 17, wherein the contoured inner surfaces are engaged with the outer surfaces of the rollers 130 and thereby retain the second base frame 62 in the position shown. Removal of the engagement structure from the rollers 130 is permitted by manually rotating the service door 44 and second base frame 62 in the opposite direction, forcing the contoured convex surfaces to compress and roller over the rollers 130, and thus pop out of engagement therewith.

Referring to FIGS. 4 and 12, a fulcrum member is provided on the intermediate frame, being configured such that the front portion 96 of the second base frame 62 becomes preloaded or stressed across the fulcrum member and with respect to the clevis device 100 and detent mechanism when the engagement structure pops into engagement with the rollers 130. In particular, a pair of stop flanges 134 extend from the intermediate frame 66, inwardly from the clevis arms 104. A corresponding pair of stop surfaces 136 on outer sides of the front portion 96 engage with the stop flanges 134. The stop flanges 134 and stop surfaces 136 are configured such that as the flanges 126 roll over the outer surfaces of the rollers 130 and into engagement, as shown in FIG. 17, the front portion 96 of the second base frame 62 is "fulcrumed" or stressed across the stop flanges 134, between the clevis device 100 and detent mechanism, thus facilitating a tight engagement by the detent mechanism. Thus the resiliency of the rollers 130 and the configuration of the fulcrum member facilitate a tight connection between components and reduces or eliminates rattling that is typical with a conventional hinge connection.

Referring to FIGS. 4 and 9-10, a locking device is configured to lock and alternately unlock the detent mechanism in its engaged position. The locking device is a slider mechanism, which as shown in FIG. 9 is manually slide-able into a locked position in which the engagement structure is locked on the rollers 130 and an unlocked position in which the engagement structure is unlocked from the rollers 130. As shown in FIG. 4, the slider mechanism includes a slider bar 142 having a center boss 144 that extends through an aperture 147 in the base portion 102 of the intermediate frame 66. The center boss 144 is fixed to a backing bracket 146 by a pair of fasteners 148. A locking finger 150 is affixed to the backing bracket 146 by the fasteners 148. A pair of recesses 151 on the inner surface of the base portion 102, adjacent to the aperture 147, receive inner contours of the backing bracket 146 when the slider mechanism is moved into the respective locked and unlocked positions, thus providing a detent functionality that registers the slider mechanism in each position. An engagement tab 152 extends inwardly from one of the flanges 126 on the front portion 96 of the second base frame 62. As shown by dash-and-dot lines in FIGS. 9 and 10, the locking finger 150 is slid in behind the engagement tab 152 when the detent mechanism is engaged and the slider bar 142 is manually slid into the position shown in dash-and-dot lines in FIG. 9. Manually sliding the slider bar 142 into the position shown in solid lines in FIG. 9, slides the locking finger 150 out from behind the engagement tab 152 and thus permits actuation of the detent mechanism and pivoting of the second base frame 62, see dashed line arrow A and solid line arrow B in FIG. 11. The slider mechanism is sized and shaped so that it will fracture or otherwise fail when it or the service door 44 is subjected to a heavy load, which advantageously permits the service door 44 to break free from the top cowl body 42 and prevents damage that would otherwise occur to the service door 44 and/or top cowl body 42.

Figure 6:
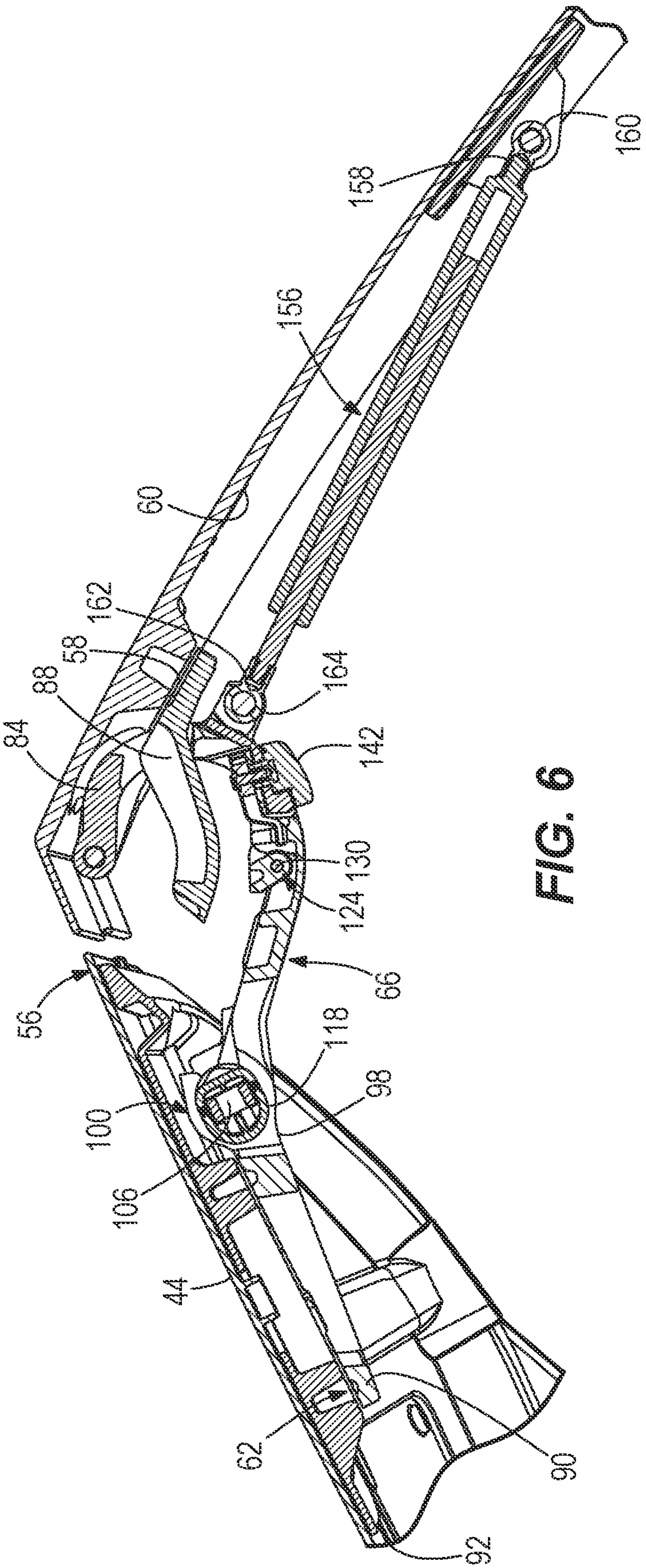
FIG. 6 is a view of section 6-6, taken in FIG. 2.

Referring to FIG. 3, a gas spring 156 assists movement of the second base frame 62 and intermediate frame 66 into the raised position and dampens movement of the second base frame 62 and intermediate frame 66 into the lowered position. The gas spring 156 has a first end 158 coupled to the interior surface 60 of the top cowl body 42 by a universal ball joint and mounting bracket 160. The gas spring 156 has a second end 162 coupled to the intermediate frame 66, particularly by a universal ball joint and mounting bracket 164 along the outer curved surface of the pivot arm 80. As can be seen in FIGS. 6-8, the second end 162 is spaced apart from the first pivot axis 68 such that a force lever arm is created, assisting movement of the second base frame towards the raised position. The gas spring 156 advantageously biases the second base frame member 62 and intermediate frame 66 into the raised position so that the service door 44 can be easily attached to and removed from the top cowl body 42, while the intermediate frame 66 remains in the raised position and thus is easily accessible. The gas spring 156 also securely retains the service door 44 in the open cowl position until the technician manually rotates these components back towards the closed cowl position.

Figure 13:
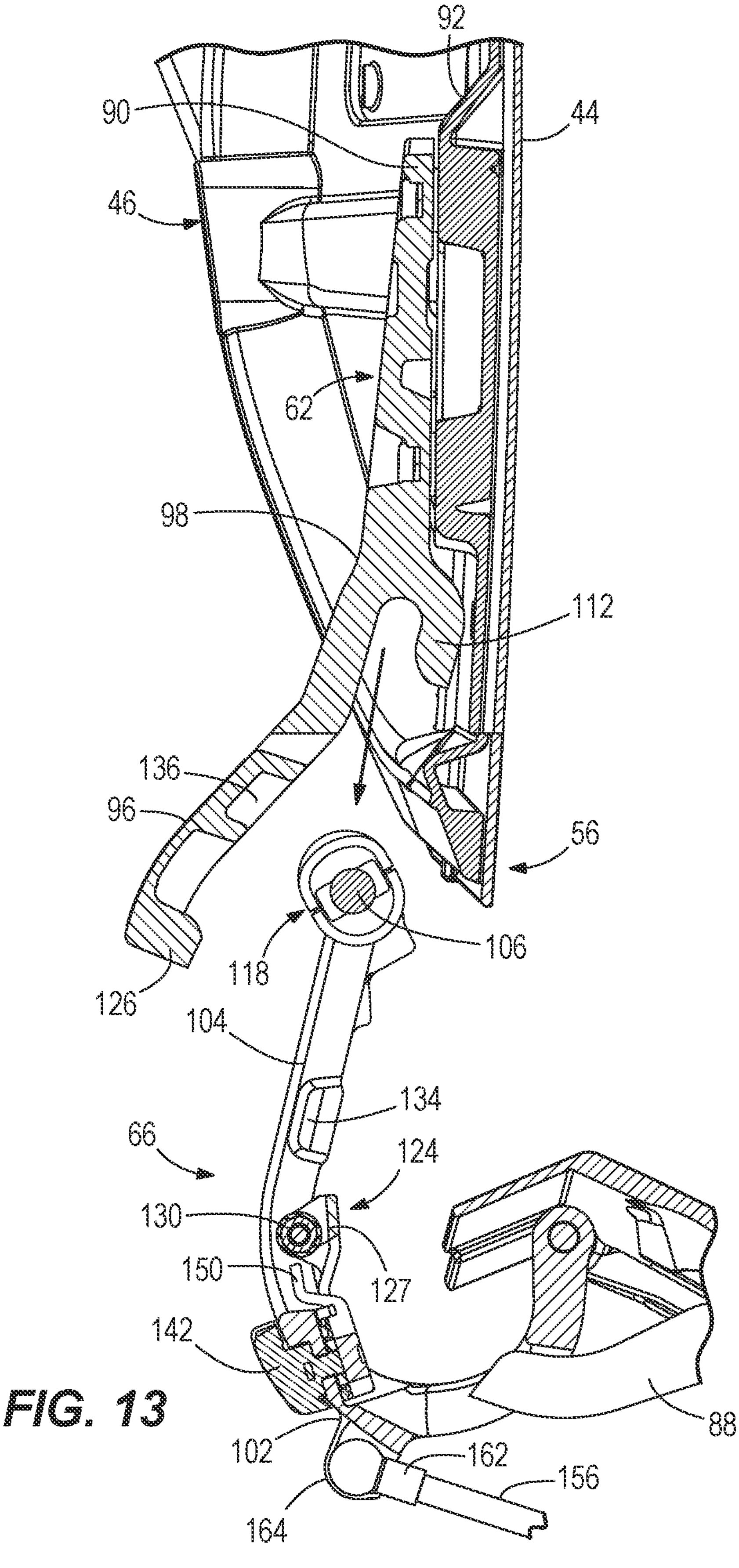
FIGS. 13-17 are sectional views sequentially showing installation of the second base frame and service door onto the intermediate frame and top cowl body via the clevis device and detent mechanism.
Figure 14:
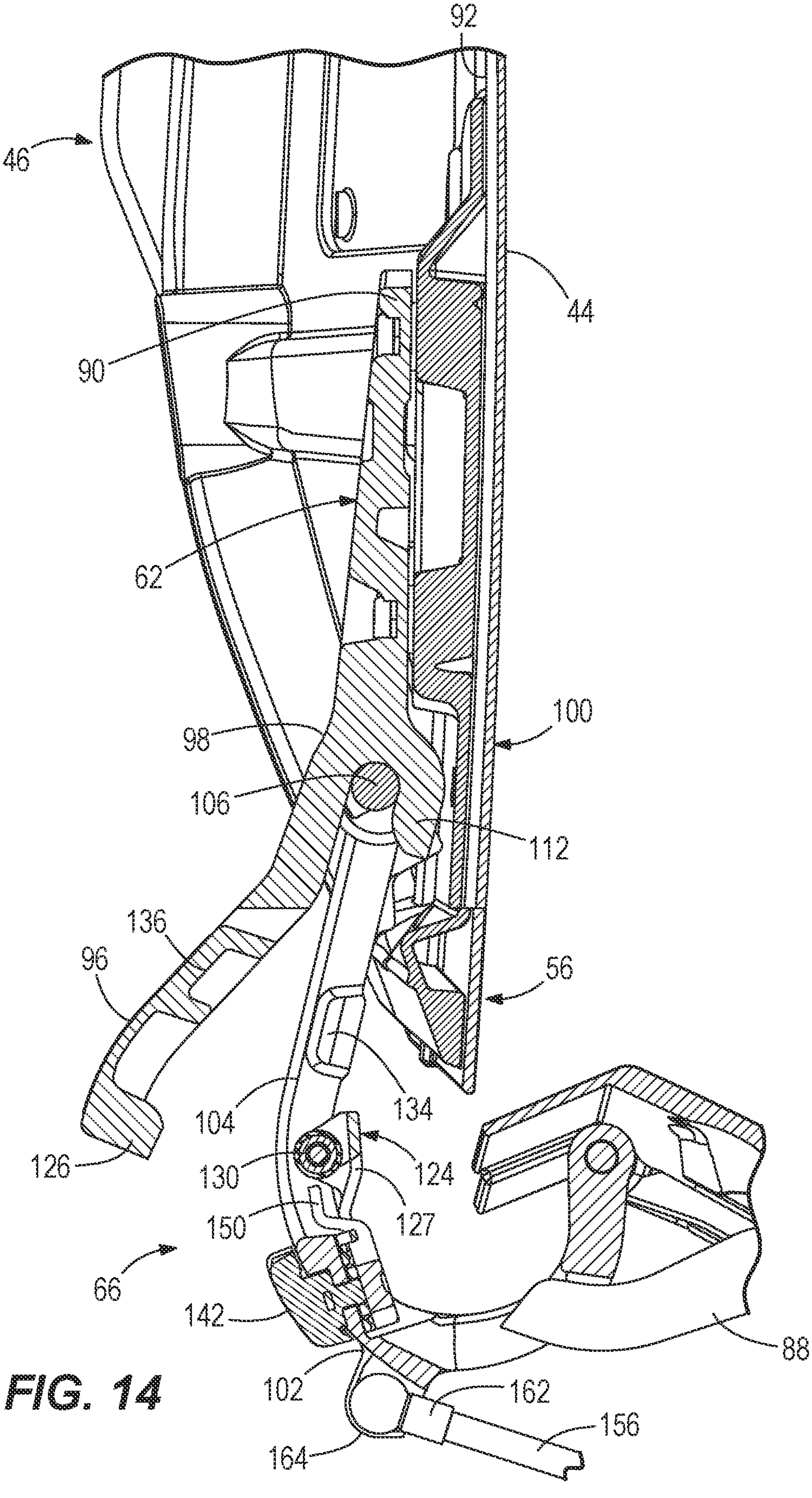
Figure 16:
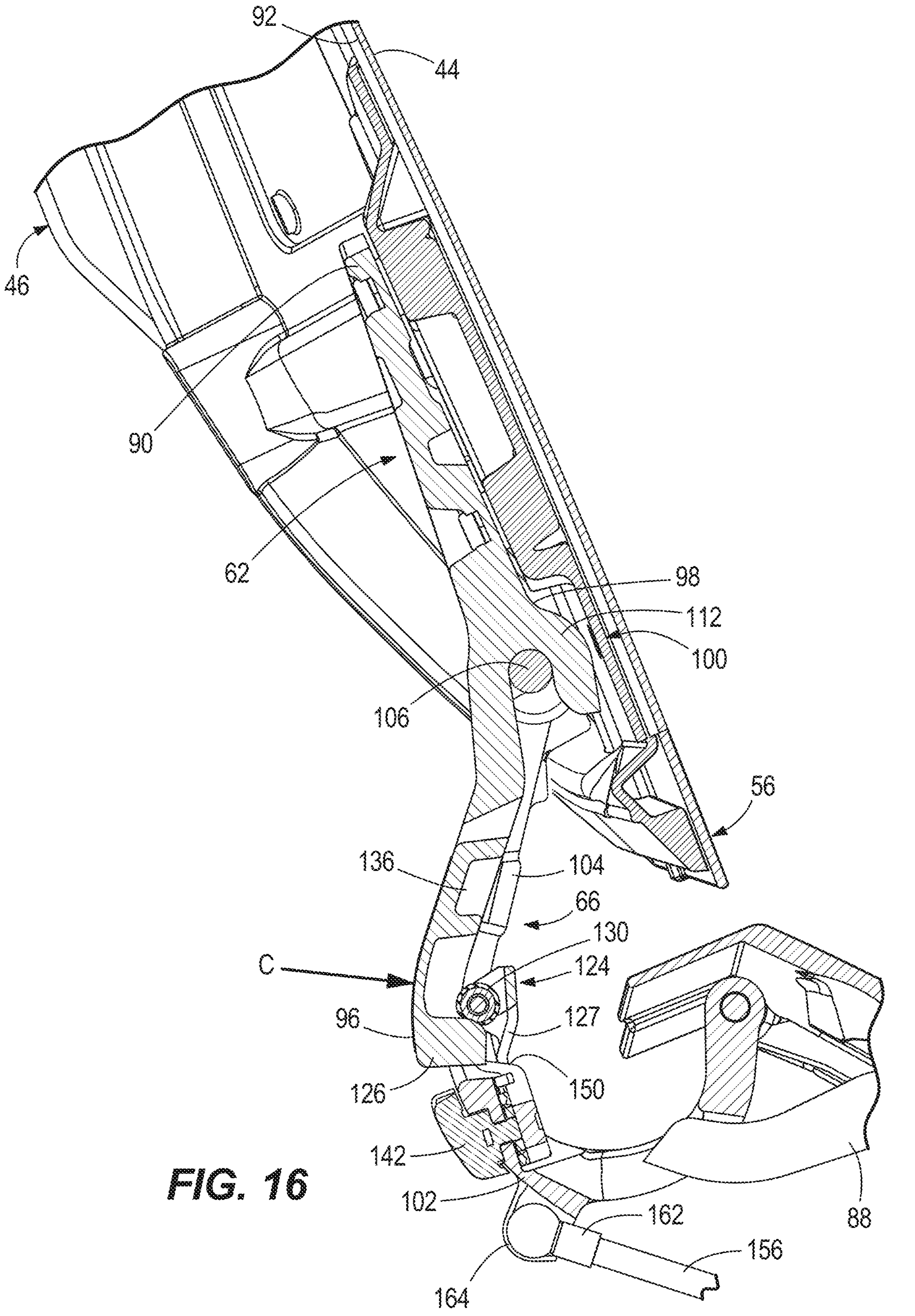

When viewed in sequence, FIGS. 13-17 illustrate of the service door 44 onto the top cowl body 42. Referring to FIGS. 13 and 14, the service door 44 and second base frame 62 are lowered onto the intermediate frame 66 until the clevis hooks 112 are engaged on the clevis axle 106, on opposite sides of the handle 118. Referring to FIGS. 15 and 16, the service door and second base frame 62 are then manually pivoted about the second pivot axis 70, as facilitated by the clevis device 100 until the flanges 126 engage with and roll over the rollers 130 and pop into the position shown in FIG. 17, see solid line arrows C (FIG. 16) and D (FIG. 17). Next, the locking device can be manually actuated, in the manner explained herein above with reference to FIGS. 9 and 10, to lock the service door 44 and top cowl body 42 in place. Finally, the service door 44, top cowl body 42 and intermediate frame 66 can be manually pivoted together into the lowered and closed cowl position, shown in FIG. 2, wherein these components can be latched in place by the latching device 50. Optionally, a fulcrum device 141 tightly secures the service door 44 in the closed cowl position such that the service door 44 is "fulcrumed" or preloaded across the device, thus reducing or eliminating loose connection and rattling of components. Referring to FIG. 3, the fulcrum device 141 includes opposing engagement surfaces on the outer perimeter 46 of the service door 44 and the outer perimeter of the top cowl body 42, which engage each other and preload the service door 44 thereacross, with respect to the hinge assembly and latching device 50.

It will thus be understood that the present disclosure provides a novel and inventive hinge assembly and cowling having the hinge assembly for a marine drive, such as an outboard motor. The cowling has a first cowl portion and a second cowl portion that is movable with respect to the first cowl portion so as to provide manual access to a cowl interior. The hinge assembly has a first base frame fixed to an interior of the first cowl portion; a second base frame fixed to an interior of the second cowl portion; and an intermediate frame that is pivotally coupled to the first base frame along a first pivot axis and pivotally coupled to the second base frame along a second pivot axis, wherein the intermediate frame and the second base frame are pivotable together about the first pivot axis, so as to pivot the second cowl portion relative to the first cowl portion, thereby facilitating opening of the cowl interior and alternately closing of the cowl interior.

The second base frame and the intermediate frame are pivotable together about the first pivot axis into and between a lowered position in which the second cowl portion encloses the cowl interior and a raised position in which the cowl interior is manually accessible. The second base frame is pivotally coupled to the intermediate frame by a connection device that enables manual removal of the second base frame from the intermediate frame without use of a tool, thus facilitating manual removal of the second cowl portion from the first cowl portion without the use of the tool.

A detent mechanism retains the second base frame in position with respect to the intermediate frame. A clevis device has at least one clevis hook that engages with a clevis axle on the intermediate frame. A handle on the clevis axle is configured for manually grasping and lifting of the first cowl portion via the intermediate frame and the first base frame when the intermediate frame is in the raised position and the second base frame is removed from the intermediate frame. A gas spring assists movement of the second base frame and intermediate frame into the raised position and dampens movement of the second base frame and intermediate arm into the lowered position.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A cowling for a marine drive, the cowling comprising:
a top cowl defining a cowling interior,
a service door that is pivotable relative to the top cowl into an open position providing access to the cowling interior and a closed position enclosing the cowl interior,
a latching device that is positionable in a latched position which retains the service door in the closed position and an unlatched position which permits movement pivoting of the service door to the open position, and
a hinge assembly that couples the service door to the top cowl so the service door is pivotable from the closed position to the open position, and then further pivotable past the open position,
wherein the hinge assembly is configured so removal of the service door from the top cowl is prevented as the service door is pivoted from the closed position to the open position, and so further pivoting of the service door past the open position permits toolless removal of the service door from the top cowl.

2. The cowling according to claim 1, wherein the service door comprises a lower outer perimeter that faces an upper outer perimeter of the top cowl when the service door is in the closed position.

3. The cowling according to claim 1, wherein the top cowl comprises a front side and a rear side, wherein the service door comprises a front side and a rear side, and wherein the latching device latches the front side of the service door adjacent the front side of the top cowl, and wherein the hinge assembly is located closer to the rear side of the service door than the front side of the service door, so that unlatching the latching device facilitates pivoting of the service door upwardly and rearwardly relative to the top cowl.

4. The cowling according to claim 1, wherein the hinge assembly facilitates pivoting of the service door relative to the top cowl from the closed position to the open position about a first pivot axis, and wherein the hinge assembly further facilitates pivoting of the service door relative to the top cowl past the open position about a second pivot axis.

5. The cowling according to claim 1, further comprising a detent mechanism that retains the service door coupled to the top cowl via the hinge assembly, wherein pivoting of the service door relative to the top cowl past the open position overcomes a detent force applied by the detent mechanism which permits said toolless removal of the service door from the top cowl.

6. The cowling according to claim 5, wherein the detent mechanism comprises a roller assembly that applies the detent force.

7. The cowling according to claim 5, wherein the detent mechanism comprises an engagement structure that is retained in place by an eccentric compression which can be overcome by rotating the service door relative to the top cowl past the open position and thus cause the engagement structure to pop out of place.

8. The cowling according to claim 7, further comprising a fulcrum member configured such that a front portion of the hinge assembly is preloaded or stressed across the fulcrum member when the engagement structure is retained in place.

9. The cowling according to claim 5, further comprising a locking device that permits and alternately prevents operation of the detent mechanism.

10. The cowling according to claim 9, wherein the locking device comprises a slider that is slidable relative to the hinge assembly to lock and unlock the detent mechanism.

11. A cowling for a marine drive, the cowling comprising:
a top cowl defining a cowling interior,
a service door that is pivotable relative to the top cowl to an open position providing access to the cowling interior and a closed position enclosing the cowl interior,
a latching device that is positionable in a latched position which retains the service door in the closed position and an unlatched position which permits movement pivoting of the service door to the open position, and
a hinge assembly that couples the service door to the top cowl so the service door is pivotable from the closed position to the open position and then further pivotable past the open position,
wherein the hinge assembly comprises a clevis device that facilitates pivoting of the service door relative to the top cowl past the open position and permits toolless removal of the service door from the top cowl.

12. A cowling for a marine drive, the cowling comprising:
a top cowl defining a cowling interior,
a service door that is pivotable relative to the top cowl to an open position providing access to the cowling interior and a closed position enclosing the cowl interior,
a latching device that is positionable in a latched position which retains the service door in the closed position and an unlatched position which permits movement pivoting of the service door to the open position, and
a hinge assembly that couples the service door to the top cowl so the service door is pivotable from the closed position to the open position and then further pivotable past the open position,
wherein the hinge assembly comprises a handle that is exposed when service door is removed from the top cowl, the handle facilitating carrying of the top cowl.

13. The cowling according to claim 1, further comprising a gas spring configured to assist pivoting of the service door into the open position.

14. A cowling for a marine drive, the cowling comprising:
a top cowl defining a cowling interior,
a service door that is pivotable relative to the top cowl to an open position providing access to the cowling interior and a closed position enclosing the cowl interior,
a latching device that is positionable in a latched position which retains the service door in the closed position and an unlatched position which permits movement pivoting of the service door to the open position, and
a hinge assembly that couples the service door to the top cowl, so the service door is pivotable from the closed position to the open position and then further pivotable past the open position,
wherein the service door is fulcrumed across a fulcrum device so as to reduce or eliminate rattling of components.

15. The cowling according to claim 1, wherein the cowling comprises an outboard motor cowling.

16. An outboard motor for propelling a marine vessel, the outboard motor comprising:
a top cowl having a front side that faces the marine vessel and a rear side that faces away from the marine vessel,
a service door that is pivotable up relative to the top cowl into an open position providing top-down access to a cowling interior defined by the top cowl and down relative to the cowl into a closed position enclosing the cowl interior, a latching device that is positionable in a latched position in which a front side of the service door is retained in the closed position and an unlatched position in which pivoting of the service door to the open position is permitted, and a hinge assembly that couples the service door to the top cowl so that the service door is pivotable up into the open position and down into the closed position, and then further pivotable past the open position, wherein the hinge assembly is configured so removal of the service door from the top cowl is prevented as the service door is pivoted from the closed position to the open position, and so further pivoting of the service door past the open position permits toolless removal of the service door from the top cowl.

17. The outboard motor according to claim 16, wherein the hinge assembly facilitates pivoting of the service door relative to the top cowl from the closed position to the open position about a first pivot axis, and wherein the hinge assembly further facilitates pivoting of the service door relative to the top cowl past the open position about a second pivot axis.

18. The outboard motor according to claim 16, wherein the hinge assembly comprises a clevis device that facilitates pivoting of the service door relative to the top cowl past the open position and permits toolless removal of the service door from the top cowl.

19. The outboard motor according to claim 16, further comprising a gas spring configured to assist pivoting of the service door into the open position.

20. A cowling for a marine drive, the cowling comprising:

a top cowl defining a cowling interior, a service door that is pivotable relative to the top cowl to an open position providing access to the cowling interior and a closed position enclosing the cowl interior, a latching device that is positionable in a latched position which retains the service door in the closed position and an unlatched position which permits movement pivoting of the service door to the open position, and a hinge assembly that couples the service door to the top cowl so the service door is pivotable from the closed position to the open position and then past the open position, wherein the hinge assembly is configured so pivoting of the service door past the open position permits toolless removal of the service door from the top cowl.

* * * * *